G. T. REISS.
REAMER TAP.
APPLICATION FILED FEB. 5, 1908.
899,759.
Patented Sept. 29, 1908.
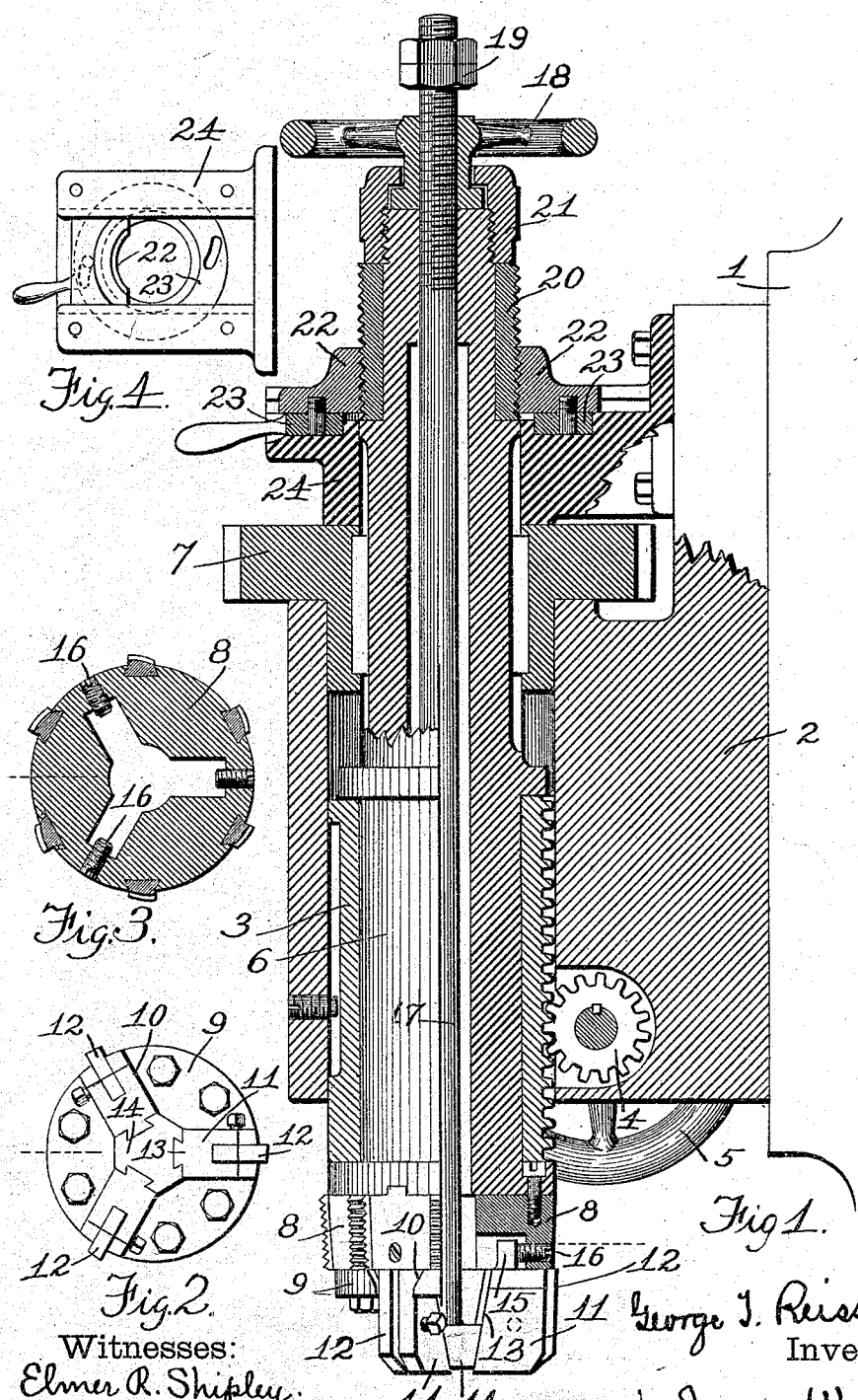
Witnesses:
Elmer R. Shipley.
M. S. Belden.
George T. Reiss
Inventor
by James W. See
Attorney

UNITED STATES PATENT OFFICE.

GEORGE T. REISS, OF HAMILTON, OHIO, ASSIGNOR TO NILES-BEMENT-POND COMPANY, OF JERSEY CITY, NEW JERSEY.

REAMER-TAP.

No. 899,759.      Specification of Letters Patent.      Patented Sept. 29, 1908.

Application filed February 5, 1908. Serial No. 414,319.

*To all whom it may concern:*

Be it known that I, GEORGE T. REISS, a citizen of the United States, residing at Hamilton, Butler county, Ohio, have invented certain new and useful Improvements in Reamer-Taps, of which the following is a specification.

This invention pertains to improvements in taps combined with reamers and has been contrived with special reference to the reaming and tapping of the tapered openings in pipe fittings of large size, and the invention will be readily understood from the following description taken in connection with the accompanying drawing in which:—

Figure 1 is a side elevation, part vertical section, of a reamer tap exemplifying my invention: Fig. 2 a bottom view of the reamer: Fig. 3 a horizontal section of the tap: and Fig. 4 a plan of a portion of the leader-nut.

In the drawing:—1, indicates a frame-portion of a reaming and tapping machine: 2, a bracket supported thereby: 3, a sleeve vertically movable in the bracket: 4, a feed pinion journaled in the bracket and engaging a rack on the sleeve: 5, a hand-wheel for turning the pinion: 6, a tap and reamer shank journaled in the sleeve and having collars engaging the ends thereof: 7, a gear supported by the bracket and splined on the shank and typifying means for turning the reamer and tap by power: 8, a tapering tap rigidly carried by the lower end of the shank, this tap being illustrated as of the inserted blade type and as being a structure rigidly but separably secured to the lower end of the shank: 9, a disk fast on the lower end of the tap: 10, dovetailed or undercut radial grooves in this disk, shown as three in number: 11, reamer jaws mounted to slide in these grooves: 12, a reamer blade rigidly secured in the outer portion of each reamer jaw, these blades being of a length and exterior taper to produce the proper hole for the tap: 13, downwardly converging dovetailed faces on the inner portions of the reamer jaws: 14, a dovetail block fitting these inner faces of the reamer jaws and adapted for vertical adjustment within the series of jaws: 15, a lug projecting upwardly from each jaw within a suitable cavity in the lower face of the tap: 16, radial stop-screws carried by the tap with their inner ends in position to arrest the outward movement of the lugs 15: 17, a stem projecting from adjusting head 14 up axially through the shank: 18, a hand-wheel threaded on the upper end of this stem: 19, adjustable stop-nuts on the stem above the hand-wheel: 20, a leader-sleeve secured to the upper end of the shank and having an exterior thread corresponding in pitch with that of the tap: 21, a cap screwed to the upper end of the shank and serving to clamp the leader-sleeve in place and serving also to engage over a flange on the hand-wheel 18 and prevent the rising of the hand-wheel relative to the sleeve: 22, radially movable nut-sections carried by the bracket and adapted to engage the leader-sleeve: 23, a cam-ring supported by the bracket and engaging the nut-sections in the ordinary manner of open-and-shut nuts: and 24, a separable portion of the bracket, this portion carrying the nut-sections and cam and engaging over the gear 7.

Power applied to gear 7 turns the shank and with it the tap and reamer and, the sectional nut being open, the tap and reamer may be fed vertically by hand-wheel 5.

Taps of large size will not start satisfactorily without the aid of a leader, hence the employment of the leader and sectional nut, which latter is to be closed when the tap is to be put to work.

In using this contrivance the stem with its head 14 is to be forced downward by turning the hand-wheel 18. This forces the reamer jaws outwardly till their lugs 15 are solidly against the stop-screws 16, which stop-screws are to have been so adjusted that the reamer-blades will produce the precise diameter of hole desired for the tap. It will be observed that at this time the mechanism for adjusting the reamer blades is under strain, producing solidity of structure, one abutment being found at the lugs 15 and the other abutment being found where the hand-wheel engages under cap 21. The same adjustment of the reamer could of course be made in the absence of the lugs 15, as by depending upon stop-nuts 19, but in such case the jaws carrying the blades would not be so solidly held, owing to the fact that their stability would depend upon the tightness of the fitting of head 14 within the jaws, a matter which may be ignored when lugs 15 are employed.

The reamer having been thus adjusted for its work, the hole to be tapped is to be properly reamed, in an obvious manner. The reamer having descended a proper depth into the hole and finished its work it is obvious that the reamer, if solid, could not pass on through the hole so as to permit the tap to go to work in the hole and, furthermore, the interior conformation of the walls of pipe fittings, elbows for instance, is generally such as not to permit the presence of a large projection below a tap working full depth in the hole. Therefore, when the reaming is done, the stem is drawn upwardly by means of hand-wheel 18, thus moving the reamer jaws and blades inwardly and collapsing the reamer, after which the sectional nut may be closed and the tapping of the hole proceeded with. The collapsing of the reamer fits it for passing through the hole produced by it and fits it for clearing the inner portions of the walls of pipe fittings.

I claim:—

1. A reamer tap comprising, a shank, a tap rigidly carried by one end thereof, a collapsible reamer carried by the end of the tap, and means for expanding and contracting the reamer, combined substantially as set forth.

2. A reamer tap comprising, a shank, a tap rigidly carried by one end thereof, a collapsible reamer carried by the end of the tap, adjusting mechanism at the other end of the shank, and a stem extending axially through the shank and tap and connecting the adjusting mechanism with the reamer and serving to expand and contract the reamer, combined substantially as set forth.

3. A reamer tap comprising, a shank, a tap rigidly carried by one end thereof, radial guideways carried by the end of the tap, blade-carrying jaws sliding in said guideways and having converging inner faces, a vertically movable head engaging the inner faces of said jaws, means for vertically adjusting said head, radial stop-screws carried by the tap, and lugs carried by said jaws and adapted to engage the inner ends of the stop-screws, combined substantially as set forth.

4. A reamer tap comprising, a shank, a tap rigidly carried by one end thereof, radial guideways carried by the end of the tap, blade-carrying jaws sliding in said guideways and having converging inner faces, a vertically movable head engaging the inner faces of said jaws, a stem connected with said head and passing axially through the tap and shank, a hand-nut screwed on the end of the stem opposite said head, and means for preventing movement of said hand-nut axially with reference to the shank, combined substantially as set forth.

5. A reamer tap comprising, a shank, a tap rigidly carried by one end thereof, radial guideways carried by the end of the tap, blade-carrying jaws sliding in said guideways and having converging inner faces, a vertically moving head engaging the inner faces of said jaws, a stem connected with said head and passing axially through the tap and shank, a hand-nut screwed on the end of the stem opposite said head, means for preventing movement of said hand-nut axially with reference to the shank, and an adjustable device to positively limit the movement of said stem axially with reference to said shank, combined substantially as set forth.

6. A reamer tap comprising, a shank, a tap rigidly carried by one end thereof, reamer jaws carried by the end of the tap and adapted for inward and outward motion, means for moving said reamer jaws, and adjustable stops for positively limiting the outward movement of the reamer jaws, combined substantially as set forth.

7. A reamer tap comprising, a shank, a tap rigidly carried by one end thereof, a collapsible reamer carried by the end of the tap, means for expanding and contracting the reamer, a vertically adjustable sleeve forming the bearing for said shank, means for adjusting said sleeve endwise, mechanism whereby rotary motion may be imparted to said shank, a leader on said shank, a sectional nut for said leader, and means for opening and closing said nut, combined substantially as set forth.

8. A reamer tap comprising, a shank, a sectional disk secured at the end of the shank and forming radial guideways between its sections, reamer jaws sliding in said guideways, an adjusting head engaging within the series of reamer jaws and adapted to expand and contract the diameter of the series of jaws, a stem extending from said adjusting head axially through the shank, and means connected with said stem at the other end of the shank for adjusting the stem endwise, combined substantially as set forth.

GEORGE T. REISS.

Witnesses:
ROBERT B. MILLIKIN,
M. S. BELDEN.